UNITED STATES PATENT OFFICE.

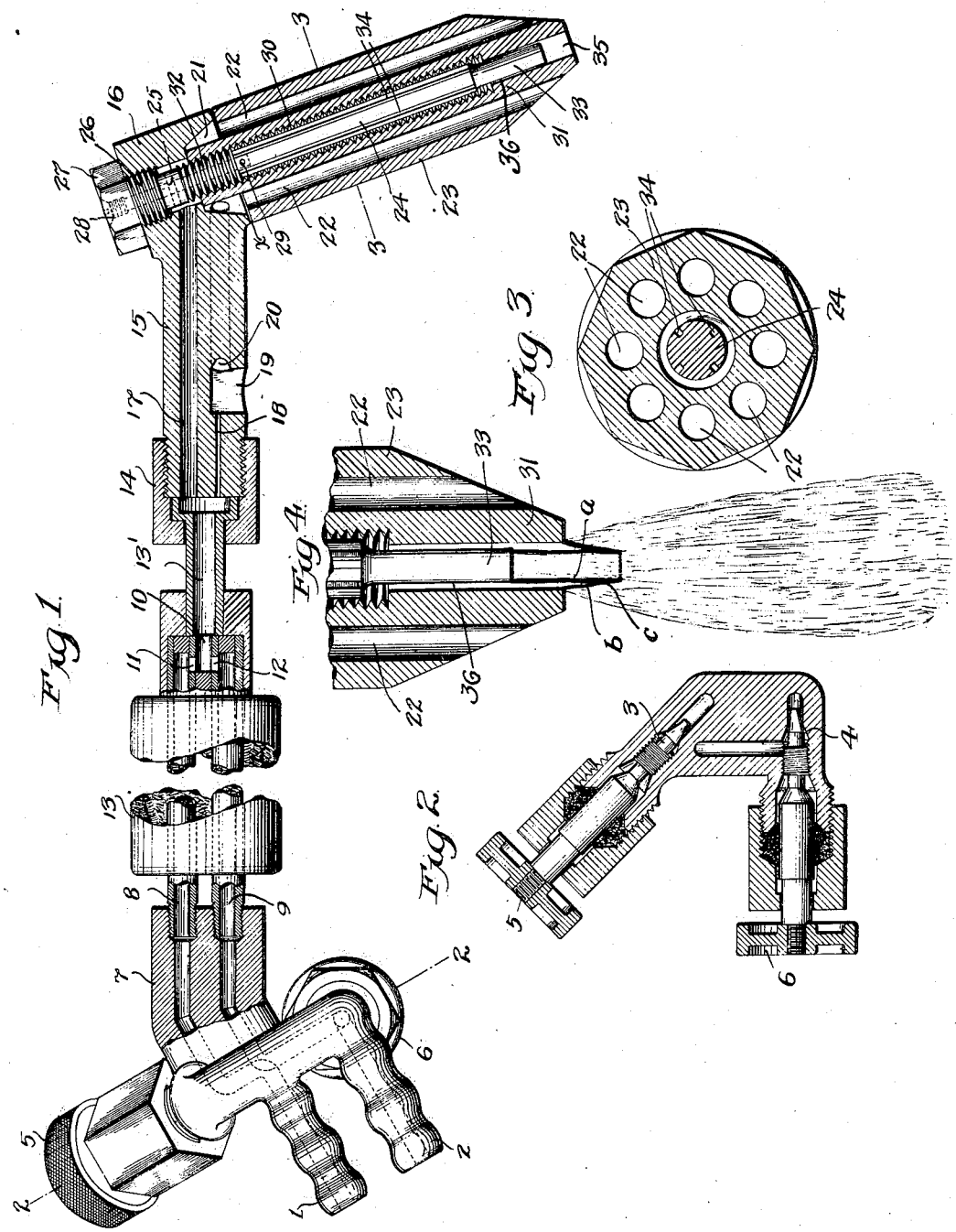

RUDOLPH VUILLEUMIER, OF NEW ROCHELLE, NEW YORK, ASSIGNOR TO THE SAFETY CAR HEATING & LIGHTING COMPANY, A CORPORATION OF NEW JERSEY.

WELDING-TORCH.

1,214,727.  Specification of Letters Patent.  Patented Feb. 6, 1917.

Application filed September 29, 1913. Serial No. 792,287.

*To all whom it may concern:*

Be it known that I, RUDOLPH VUILLEUMIER, a citizen of the United States, residing in New Rochelle, county of Westchester, and State of New York, have invented a new and useful Improvement in Welding-Torches, of which the following is a description.

This invention has reference to welding-torches and particularly relates to torches for autogenous welding capable of producing a flame of high heat intensity from oil gas and oxygen.

Among the objects of this invention may be noted the following: to provide a welding-torch capable of using oil-gas in autogenous welding; to provide a welding-torch with means for effectively mixing the gases employed by it as a preliminary to combustion; to provide a welding-torch having means by which oil-gas and other gases may be combined and properly distributed therein to produce the effective flame; to provide a welding-torch with means for regulating the admission of the gases thereto, mixing the same therein and properly distributing the same preliminary to flame-production; to provide a welding-torch by means of which the gases employed may be preheated as a preliminary to use; to provide a welding-torch so constructed as to furnish a welding-flame and an independent preheating flame for the welding-flame, thus increasing the rapidity of combustion of the gases and decreasing the length of the flame; to provide a welding-torch with means by which the flame may be materially shortened and intensified by automatically mixing and preheating the gases; and to provide a simple, compact torch capable of being cheaply produced and very effective for the purposes intended.

With the above object in view and others which will be detailed during the course of this description, my invention consists in the parts, features, elements and combinations of elements hereinafter described and claimed.

In order that my invention may be clearly understood, I have provided drawings wherein:

Figure 1 shows my torch broken in the middle to curtail the view and shown partially in longitudinal section and partially in elevation; Fig. 2 is a section substantially on the line 2—2 of Fig. 1; Fig. 3 is a section substantially on the line 3—3 of Fig. 1; and Fig. 4 is a section, the same as that of Fig. 1, of the lower end of the tip, showing flame production.

The structural features embodied in my torch have been made with special reference to welding by means of oil-gas and oxygen and are specially directed to the production of a flame of high heat intensity, such as is required in autogenous welding. It is well known that the combustion of oil-gas is slow as compared with acetylene-gas, and that the natural tendency of oil-gas is to produce a long flame as compared with the short and concentrated flame of acetylene-gas; and, notwithstanding the fact that oil-gas can be equal to acetylene-gas in calorific value, the flame thereof, under ordinary conditions, is of considerable less intensity. In autogenous welding, where the gases issue from the tip of the torch at a very high velocity, the length of the flame plays a very important part; and, on account of the entraining action of the burning gases issuing from the tip of the torch, a large amount of air finds its way into the flame, resulting in a cooling effect, which is largely due to the great percentage of entrained, inert nitrogen. It can be readily seen, therefore, how important it is to have the flame develop in the shortest distance possible from the end of the tip, in order to avoid this air-entraining action. Therefore, it has been one of my objects to shorten, as much as possible, the natural flame of oil-gas and oxygen and to obtain by concentration a greater flame intensity.

In experimentations, I have found that, by preheating the mixture of gas and air inside of the tip, the combustion of the gases becomes much more rapid and the flame correspondingly shorter; and, in connection with oil-gas, I found that this preheating of the mixture of oxygen and oil-gas can be carried to temperatures of upward of 1,250° Fahrenheit. I also found that, beside accelerating combustion, the preheating has the desirable influence of adding to the resultant flame-temperature. Furthermore, in order to additionally eliminate the cooling influence of the entrained air, I found it possible to have the welding-flame developed partly inside the tip of the torch, thus producing combustion before the burning gases actually issue from the end of the tip, hence the result of a still shorter flame at the end of the tip with correspondingly increased flame intensity. My experiments also resulted in the discovery that an intimate mixing of the two gases referred to is required in order to obtain the best results, hence the mixing feature of my torch.

Referring to the drawings, my invention will be readily understood and, therein, the numeral 1 indicates the hose connection for the oil-gas inlet, and 2 the hose connection for the oxygen-gas inlet, each inlet being controlled by means of a valve indicated, respectively, at 3 and 4, the said valves being under control of the manipulating-heads 5 and 6, respectively, the valves being of any suitable form and controlling the passages of the several inlets. After leaving the valves, the gases pass separately through the passages of the stock 7 into the tubes 8 and 9, and through the same into the combining-chamber 10, the oil-gas entering through the aperture 11 and the oxygen-gas through the aperture 12. The handle 13 is provided, conveniently, for manipulating the torch. The gases unite in the chamber 10, are thoroughly mixed therein and, as combined, travel through passage 13' in a tube which is connected by the union-nut 14 with the shank 15 of the torch-head 16. At the entrance to the shank of the torch-head, the mixed gases are divided into two streams, the welding or larger stream entering the head of the torch through the large passage 17, and the smaller or preheating stream entering the head of the torch through the smaller passage 18, entraining-opening 19, and enlarged passage 20, the said smaller stream by entraining air, through the opening 19, entering the head of the torch containing more oxygen than the larger stream, which enters said head through the passage 17. The smaller stream, entering the head through the passage 20, is discharged into the chamber 21 with a whirling action tending to equally distribute the mixture in the same, this action being due to the eccentricity of the outlet of the passage 20, into the chamber 21, relatively to the latter; and the area of the passage or orifice 20 is so selected or chosen that the velocity of the gases through the same is greater than the velocity of flame propagation, so that the combustion of the gases is confined to the chamber 21 of the welding-head and no heating of the latter takes place as the result of the combustion in said chamber. The preheating flame, which has thus been started at the outlet of chamber 21, extends into the preheating orifices 22 of the welding-tip 23 and produces an even heating of the tip by internal combustion, the small diameter of the preheating orifices enabling the tip to effectually absorb the heat of the preheating gases. The larger or welding-stream traversing the passage 17, enters the head and then the hollow plunger 24 through the holes 25, the said plunger being threaded into the head as at 26 and held therein, the central longitudinal passage of the plunger being closed at its upper end by means of the screw 28. The said welding-stream then passes through the plunger to a point below the head 16 and is discharged through the holes 29 into the threads 30 of the tip 23. The tip is combined with the plunger by means of the screw-threads 32 and said plunger extends longitudinally of the tip and is centered freely in the outer end 31 of the latter by its reduced end 33. The plunger is also provided with longitudinal grooves 34. It should be noted that the grooved portion of the plunger snugly fits the screw-threaded portion of the tip and that the screw-threads of the latter encircle the grooves 34 of the plunger 24. The threads of the tip and the grooves of the plunger produce a very tortuous passage for the welding stream and compel a thorough mixing of the gases, the said threads of the tip and the grooves of the plunger being so proportioned that a definite amount of gas will pass down through each, so that at each quarter turn of the screw-threads an impinging effect between the respective streams of gas is produced, the result being a most effective mixing and commingling of the gases. The whirling action of the welding-stream, along the threads of the tip, produces the desirable effect, through its centrifugal action, of forcing the cooler or heavier portions of the gaseous mixture to the outside of the thread and the hotter or lighter portions to the inside, in this manner bringing about a more rapid heat interchange between the walls of the tip and the gaseous mixture. The threads 30 have the further advantage and effect of affording a large heating surface, which enables the use of a short welding tip and the production of a very compact structure of torch-head.

It should now be noted that the reduced end 33 of the plunger 24 does not extend to the end 31 of the tip 23, thus leaving a chamber 35 at the lower end of said tip, and that the end of the tip and the end of the plunger are so combined as to leave an annular space 36, communicating with said chamber 35 and with the threads 30 and grooves 34, through which the mixed and preheated gases are ejected from the tip to form the welding flame. Hence, under working conditions, the welding flame is annular in shape and takes its origin at the outer end of the reduced portion 33 of the plunger inside the chamber 35 of the tip, the flame propagation being in an outward direction, as clearly represented in Fig. 4, and being duplex in character. That is to say, in the operation of the torch, two phenomena present themselves, the first being that, when the heating stream of gas, entering the head 16 through the passage 20, is ignited, the flame thereof snaps back into the chamber 21 of the head and becomes a preheating flame merely and has no effect as, and does not enter into combination with, the welding flame, and is not, at any time, emitted from the end of the tip. This action is due to the fact that the flow of the heating stream of gas through the passages 22 is slower than the rate of flame propagation from the end of the tip back to the chamber 21, but the propagation of flame into the tip in this way takes place at a slower rate than the flow of gas from the passage 20 into the chamber 21, the combined cross-sectional areas of the passages 22 being so designed with reference to the cross-sectional area of the passage 20 as to give this result. The other is that the welding gas-stream, flowing through passage 17 into the head 16 and then down through the plunger and between the latter and the tip 23, has a tendency, in its egress from the tortuous passage between the plunger and the tip, to hug the walls of the chamber 35 to the outer end of the latter, and form into a hollow flame cylinder $b$; but combustion of the welding stream, taking place within the chamber 35, close to the end 33 of the plunger, results in the production of a second flame-cylinder $a$, within the other, as clearly shown in Fig. 4. The ejection of the flame-bodies thus formed takes place with such velocity that the central flame-cylinder $a$, entrains the flame-cylinder $b$, which still has a tendency to hug the walls of chamber 35, resulting in the two flame-cylinders combining a short distance beyond the end of the tip into an intense flame, substantially as indicated by $c$, Fig. 4. Now, bearing in mind that the preheating stream of gas, traversing the passage 20, is burning, or is in a state of combustion, at the outer end of the chamber 21, and inner end of welding tip 23, and that the flame thereof burns in, but at no time is emitted through, passages 22 of the tip, it will be understood that the central body of gas, passing through the tip, is not only thoroughly mixed, but highly preheated before reaching the space 36 and the chamber 35 at the outer end of the welding tip. The compact arrangement of parts and the features described result in a welding torch having a preheater for the welding gas stream which does not overheat the welding tip, and also results in a novel method of producing a short and intense welding-flame, which is characterized by the maintenance of combustion inside of a chamber of very small diameter; and the production of the preheating flame is accomplished by so regulating the mixture of two gases and the velocity of efflux thereof that, upon ignition, the flame will immediately retreat into the pre-heating chamber. By this arrangement it is possible to have both the pre-heating-flame and the welding-flame developed inside the tip, as heretofore stated, without heating the latter to any undue degree, for the reason that said tip is at all times in contact with gases of a comparatively low temperature. The further important result is that the path of flame propagation is very much shortened, thus producing a very short flame-length so that the entraining action of air at the tip is reduced to a minimum.

An important feature of construction is the separation between the head 16 and the inner end of the tip 23, which acts as a vent and eliminates any tendency to flame-vibration. It has been found that, in the absence of such vent, intermittent combustion of the gases will occur in the preheating section of the torch, causing objectionable noise. As a means for producing the above noted good results, a vent has been provided, for example, by combining and adjusting the parts so as to separate the head and tip, as shown in Fig. 1, at $x$. The vent may be produced at any other point found effective for the purpose, it being understood that when the tip is made independent of the head, and combined as shown, the vent is conveniently formed as indicated in the drawings.

I have, in the foregoing description, described my invention, in some particulars, with special reference to oil gas; but, it will be obvious, to those skilled in the art, that my torch can be employed in connection with gases of other kinds having greater or less heat-producing units. In fact, it is one of the important features of my invention that it contains means for intensifying the flame temperature of a poor gas, and the means for hastening combustion of the gases for producing the welding flame.

Having thus described my invention, what I claim and desire to secure by Letters Patent is:

1. A welding-torch having, in combination, means for the admission of gases thereto under control; means for mixing the gases; means for separating the mixed gas into two independent streams and means whereby one of the streams, in its passage through the torch, entrains another gas therewith.

2. A welding-torch having, in combination, means for admitting gases thereto under control; means for mixing the gases; means for separating the mixed gas into independent streams; and means whereby one of the streams may have another gas combined therewith in its passage through the torch.

3. A torch having a head, and means for admitting gas thereto; a tip, and means for discharging gas therefrom; and means between the head and tip providing a vent to prevent noise during operation.

4. A torch having a head and tip; means for admitting gas to the head; means for discharging gas from the tip; and means separably connecting the head and tip enabling a vent to be provided to prevent noise during operation.

5. A welding torch having means for admitting different gases thereto; means for mixing the gases therein; a combustion chamber for the gases within the torch; and means for preventing intermittent combustion and noises in the operation of the torch.

6. A welding torch having means for admitting gases thereto; means for mixing the gases therein; means for separating the mixed gases into different streams; a combustion chamber for the gases within the torch; and means for preventing one of said streams from producing noise during operation.

7. A welding torch having therein combustion chambers remote from one another and one behind the other in the length of the torch, and means combined with one of said chambers for preheating the gas therein.

8. A torch having a combustion chamber therein, and means for conveying gas to said chamber and for causing the gas in said chamber to have a whirling action.

9. A tip for torches having a combustion chamber therein, and having a direct passage to said chamber and a circuitous passage to said chamber.

10. A tip for torches having a combustion chamber therein and having a direct passage to said chamber and a circuitous passage to said chamber, said passages coöperating to combine and mix the gases before entering the said chamber.

11. A torch having a tip and provided with a combustion chamber at each end of the tip.

12. A torch having a tip and provided with a combustion chamber at each end of the tip, and also having preheating passages leading from one of said chambers, and gas passages leading to the other chamber.

13. A torch having a tip and provided with a combustion chamber at each end of the tip, and also having preheating passages leading from one of said chambers, and gas passages leading to the other chamber, the preheating chamber and passages surrounding the gas passages.

14. A tip for a welding-torch having a straight gas passage and a tortuous gas passage therein, the latter encircling the former, and a combustion chamber communicating with said passages.

15. A tip for a welding-torch having a plunger therein provided with a plurality of passages, said tip having a tortuous passage encircling the passages of the plunger.

16. A welding-torch having a head provided with a combustion chamber therein, and having a tip provided with a combustion chamber therein; and means providing a tortuous passage into one of the chambers.

17. A welding-torch having therein a combustion chamber for the preheating flame, and an independent combustion chamber for a welding flame.

18. A welding-torch having a gas-mixing means comprising a tortuous passage for the gas combined with a passage intersecting at a plurality of points the tortuous passage, said passages having a common inlet at one end of said passages.

19. A welding torch having a head and tip; means for mixing the gases passing to said head; in combination with means for subsequently producing a centrifugal action of the gases within the tip, whereby to cause the heating of the latter to be intensified.

20. A welding-torch having means for separating a body of gas into independent streams; a combustion chamber for one of the gas streams; an independent combustion chamber for another of the gas streams; and means providing independent passages for the respective gas streams communicating with the two combustion chambers.

21. A welding-torch having a shank, a head, and a tip; a plurality of gas passages through the shank, head and tip; and means including a combustion chamber in the head whereby one of the streams of gas may heat the other stream of gas prior to the combustion of the latter.

22. A welding torch having a shank, a head, and a tip; the head being arranged at an angle to the shank and provided with a combustion chamber; and the shank being provided with a gas passage therethrough communicating with said chamber; the coöperative arrangement of said passage and chamber being such that the gas entering said chamber will be given a whirling action for the purpose of equal distribution of the mixture; and the tip being provided with passages communicating with said chamber.

23. A welding torch having a shank, a head and a tip; the head being provided with a combustion chamber at the base of the tip; the shank being provided with a gas passage leading to said chamber; the tip having passages leading from said chamber; and means comprising an air inlet cooperating with said gas passage in rear of the said chamber for entraining air.

24. A welding-torch consisting of a head, a tip and a manipulating portion; means for conveying a plurality of streams of gas through the manipulating portion; means for mixing said streams of gas prior to entering the head; means for separating the mixed gases into unequal streams; and means for thoroughly mixing the larger of said streams prior to combustion.

25. A torch comprising a tip, a handle and a head, said handle having mixing means for independent streams of gas, and the tip having means for remixing one of the streams of gas; and means between the tip and the handle for separating the mixed body of gas into independent streams, and conveying one of said streams to the tip mixer.

26. A welding torch having an outlet and a heating chamber inside said torch in advance of said outlet, said chamber being adapted to permit combustion to take place therein.

27. A welding torch comprising a passage therethrough terminating in an outlet for a welding flame, a heating chamber inside said torch surrounding said passage, and one or more passages extending inside the torch along the first passage toward said outlet, said chamber being adapted to permit combustion to take place therein, and serving in combination with said second named passages to preheat the fuel passing through the first passage to the working flame of the torch.

28. A welding torch having an outlet for a welding flame, a passage leading to said outlet having means inside the same for retarding and mixing fuel on its way to said outlet, said torch also having a preheating chamber inside the same adapted to permit combustion to take place therein for the purpose of raising the temperature of the fuel supplied to said welding flame.

29. A welding torch comprising means for supplying a stream of mixed gas to provide a welding flame, and means for supplying another stream of mixed gas, said torch having a preheating chamber to which said second stream is directed, and also having an opening communicating with the second stream of gas for the purpose of entraining atmospheric air, whereby the second stream of gas is consumed within the torch.

30. A welding torch comprising a tip having an outlet passage, a passage communicating with said outlet passage and of greater diameter, a plunger in said second named passage spaced from the walls thereof, and having an end of less diameter than the body thereof projecting into the outlet passage and terminating short of the outer end of the latter.

31. A welding torch comprising a tip having an outlet passage, a passage of greater diameter than said outlet passage communicating therewith and having a helical groove extending along the length thereof, a plunger in said second named passage spaced from the walls thereof and having longitudinal grooves in its exterior surface, and having an end extending into the outlet passage, said end being of less diameter than the outlet passage and terminating short of the outer end of the latter.

In testimony whereof I have hereunto signed my name in the presence of two subscribing witnesses.

RUDOLPH VUILLEUMIER.

Witnesses:
 MAXWELL GREENBERGER,
 ELMER E. ALLBEE.